Jan. 21, 1969 W. E. FEE 3,422,558
FOOD CAN, REMINDER TAG AND HOLDER THEREFOR
Filed Jan. 3, 1967 Sheet 1 of 2
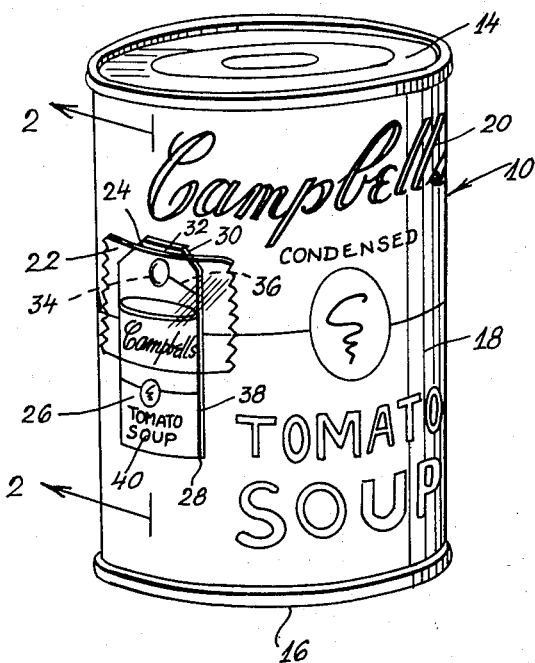
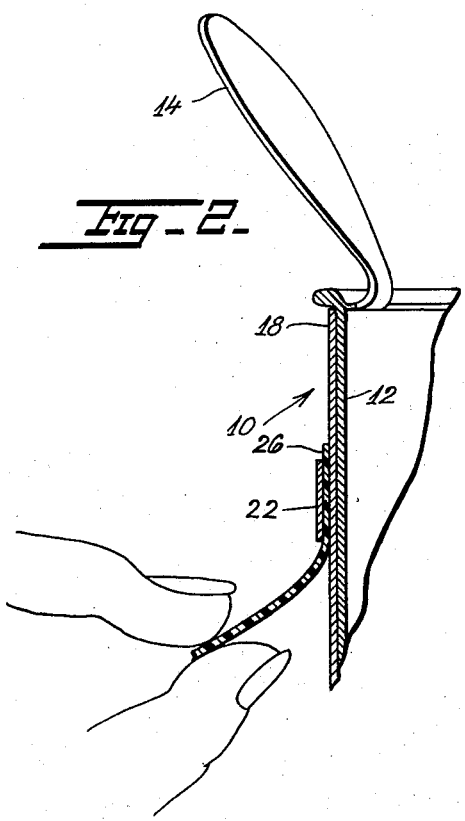
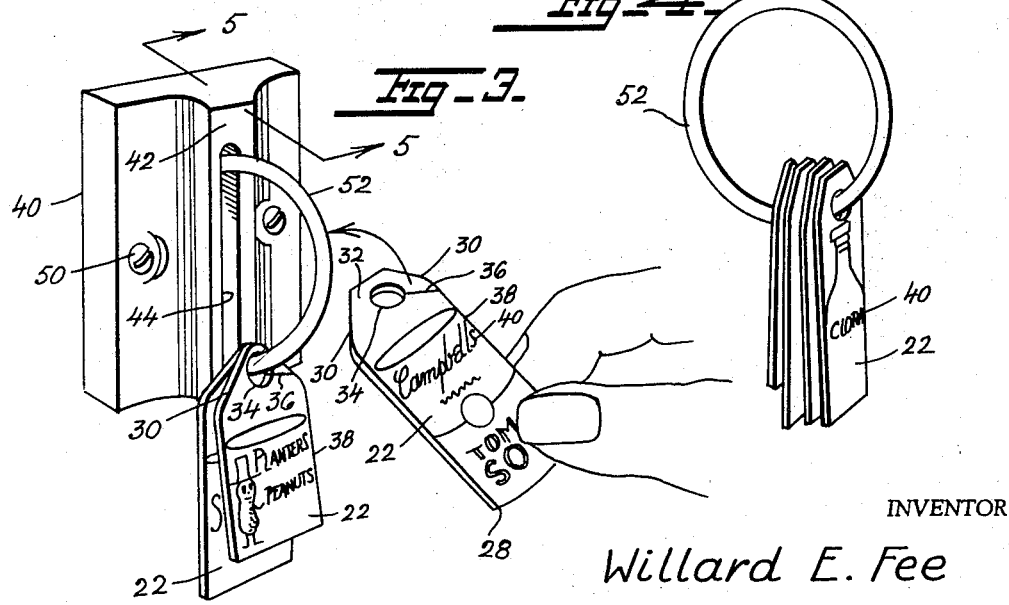
INVENTOR
Willard E. Fee
BY Polachek & Saulsbury
ATTORNEYS

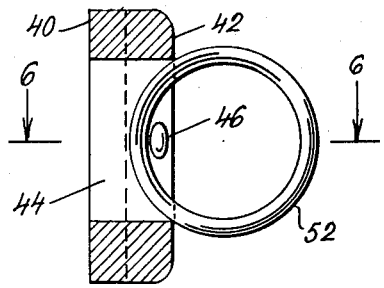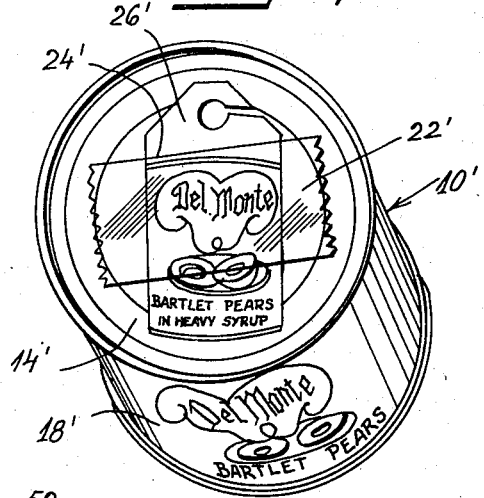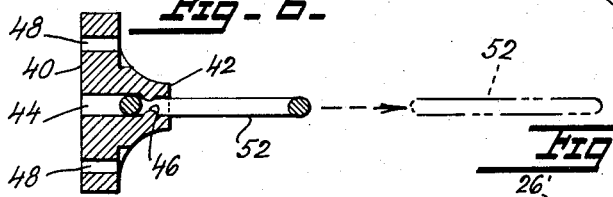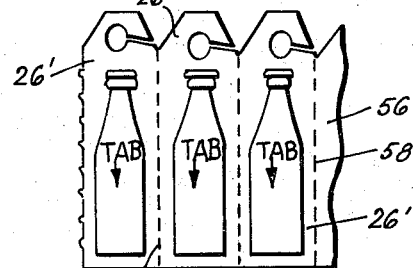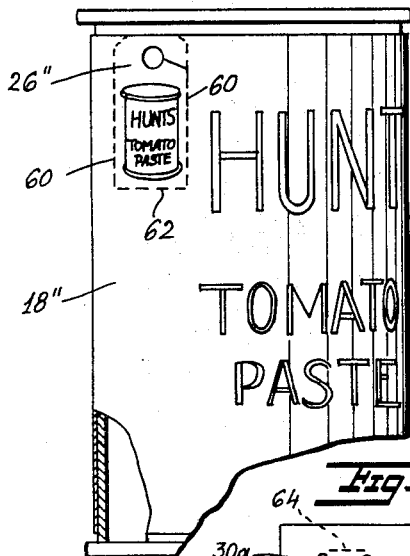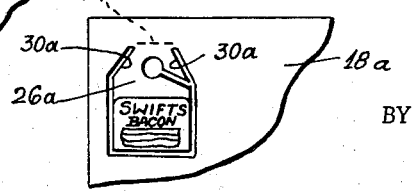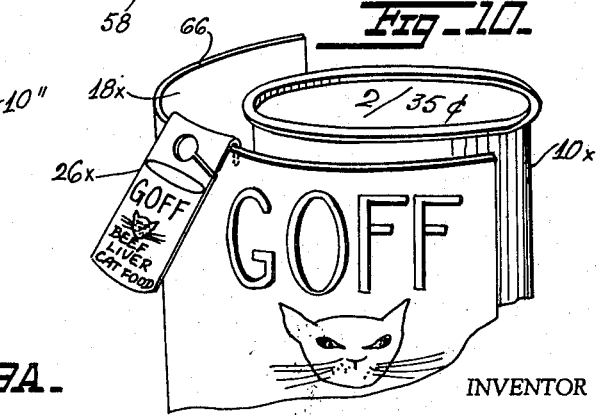

United States Patent Office 3,422,558
Patented Jan. 21, 1969

3,422,558
FOOD CAN, REMINDER TAG AND
HOLDER THEREFOR
Willard E. Fee, 1 W. Santa Inez Ave.,
San Mateo, Calif. 94402
Filed Jan. 3, 1967, Ser. No. 606,953
U.S. Cl. 40—306      1 Claim
Int. Cl. G09f 3/00; G09f 3/08

ABSTRACT OF THE DISCLOSURE

A food can with a pocket for removably supporting a reminder tag having means for readily and removably supporting the tag on a hook or file to remind the viewer that the supply or stock of such food is exhausted and needs replenishment. A holder for the removed tag is provided.

Summary of invention

Broadly, the invention comprises a food can with a label therearound and a pocket on the label. A reminder tag is removably mounted in the pocket and has identification and advertising indicia thereon and is formed with means for readily mounting the same on a ring or nail support. A holder and removable ring for supporting the removed tag is provided.

Drawings

FIGURE 1 is a front perspective view of a food can embodying a first form of the invention.

FIG. 2 is a vertical sectional view taken on the plane of the line 2—2 of FIG. 1, the top of the can being shown open and showing a step in the removal of the tag.

FIG. 3 is a front perspective view of a ring support for the tag shown in FIG. 1 and holder for the ring, a tag being shown preparatory to mounting on the ring.

FIG. 4 is a front perspective view of the ring of FIG. 3 with supported tags thereon.

FIG. 5 is a vertical sectional view taken on the line 5—5 of FIG. 3.

FIG. 6 is a cross-sectional view taken on the plane of the line 6—6 of FIG. 5 showing the ring removed in dash lines.

FIG. 7 is a top perspective view of a food can embodying a first modified form of the invention.

FIG. 8 is a fragmentary front elevational view of a strip of tags embodying a second embodiment of the invention.

FIG. 9 is a front elevational view of a food can embodying a third modified form of the invention, parts being shown broken away.

FIG. 9a is a plan view of a fragment of a label for a can showing a tag embodying a fourth modified form of the invention.

FIG. 10 is a top perspective view of a food can showing a label partly removed therefrom and having a tag embodying a fifth modified form of the invention.

Description

Referring now in detail to the various views of the drawings, in FIG. 1 a cylindrical metal food can 10 is shown having a cylindrical body 12, closed top 14 and closed bottom 16. The outer surface of the body 12 is covered with a paper label 18 having identification indicia 20 printed thereon.

In accordance with the present invention, a strip of Scotch tape 22 is secured at its ends in a horizontal position on the outer surface of the label 18, the remainder of the tape being unattached providing a slight bulge constituting a pocket 24 open top and bottom, as viewed in FIG. 1.

The present invention contemplates a shopping tag 26 in the pocket 24. The tag 26 is formed of plastic or other suitable material and has a thin, substantially rectangular body 26 with square corners 28 at one end and with slanting corners 30 at the opposite end defining a restricted portion 32 having a hole 34 centrally thereof. A slit 36 is formed in the body of the tag at its juncture with the restricted portion 32, the slit intersecting the hole 34 and the adjacent long side edge 38 of the body. The body of the tag has identification and advertising indicia 40 on its outer surface as viewed in FIG. 1.

In use, the can of food 10 is sold to the purchaser with the reminder tag 22 in the pocket 24. When the contents of the can is exhausted or nearly so, the reminder tag 22 is removed from the pocket and placed in a suitable place where it can be seen to remind the viewer that the supply of the food named on the tag needs replenishment at the proper time.

The invention further contemplates providing a novel and handy holder for the removed tag 22 so that it can readily be supported in plain view. This holder takes the form of a plastic rectangular shaped block 40 having a central enlargement 42 extetnding from one end thereof to the other on the front face thereof. The body is formed with an elongated narrow opening 44 extending through the enlargement and provided with opposed teats 46 midway the ends thereof. On opposite sides, the body is formed with holes 48 for receiving fastening screws for fastening the holder to a vertical supporting surface, such as the wall of a room.

In accordance with the invention, a metal or plastic ring 52 is provided for ready insertion into and removal from the opening 44 with the major portion of the body of the ring protruding from the body of the holder as shown in FIG. 3. The ring snaps into and out of the opening against the action of the resilient teats 46 and is held in place by said teats.

When the ring 52 is supported in the opening 44 a tag 22 may be readily and removably attached to the exposed portion of the body of the ring by placing the outer end of the slit 36 against the body of the ring and pushing the edge walls of the slit apart permitting the edge walls to slide over the ring until the hole 34 reaches and seats on the ring, as shown in FIG. 3. A plurality of tags 22 may be supported on the ring with their faces containing the indicia in plain view as seen in FIG. 3.

FIG. 7 illustrates a food can 10' embodying a modified form of the invention, which differs from the can 10 in that the tape 22' forming the pocket 24' is placed across the top 14' of the can instead of on the label 18'.

FIG. 8 illustrates a strip 56 of reminder tags 26' readily torn off the strip because of the tear lines 58 therebetween.

In FIG. 9, a can 10" embodying still another modified form of the invention is shown. The can 10" differs from the can 10 in that the pocket 24 of can 10 is eliminated and instead the reminder tag 26" is formed integral with the label 18" and is positioned at the top of the label. The tag is defined by long tear lines 60, 60 and a short tear line 62 therebetween at one end, the bottom end, the top ends of the long lines intersecting the top edge of the label 18". The tag 26" may readily be cut out from the label by means of a tool.

In FIG. 9a yet another modified form of reminder tag 26a is shown. In this form, the body of the tag is cut out of the material of the label 18a adjacent the top end thereof, leaving the top edge 64 between the slanting edges 30a, 30a uncut and attached to the label. The tag is readily removed by cutting across the top edge 64 with a tool.

In FIG. 10, a can 10x with a further modified form of reminder tag 26x is shown. The tage 26x is formed integrally with the top edge 66 of the label 18x and is formed with square cornered ends at the top and bottom. Otherwise it is similar in construction to tag 18 of FIG. 1.

I claim:
1. A metal can comprising a cylindrical body, a paper label around the body, and a removable reminder tag formed on said label, at one end thereof, said tag defined by spaced elongated parallel cuts and a cross cut joining one end of said elongated cuts, the other end of said elongated cuts terminating in inwardly slanting cuts, the material across the space between the ends of the slanting cuts being formed with a tear cut, the material of the label between the slanting cuts having a hole with a slit extending from the hole to one of the long parallel cuts, the material of the label between the elongated cuts having identification and advertising indicia thereon, said material adapted to be torn off along the tear cut.

References Cited

UNITED STATES PATENTS

| 1,004,055 | 9/1911 | Martin et al. | 40—306 |
| 2,134,002 | 10/1938 | Moat | 40—20 |
| 2,167,637 | 8/1939 | Claff | 40—312 |
| 2,335,636 | 11/1943 | Bodie | 40—307 |
| 2,420,045 | 5/1947 | Krug | 40—306 |
| 2,996,177 | 8/1961 | Sproull et al. | 40—2 X |
| 3,251,152 | 5/1966 | Takefman | 40—312 |

EUGENE R. CAPOZIO, *Primary Examiner.*

W. H. GRIEB, *Assistant Examiner.*

U.S. Cl. X.R.

40—20